March 11, 1969   J. M. FOLZ   3,432,569
RECOVERY OF FURFURAL FROM FURFURAL POLYMER BY SUCCESSIVE
EXTRACTIONS WITH A HYDROCARBON AND WITH WATER
Filed July 25, 1966
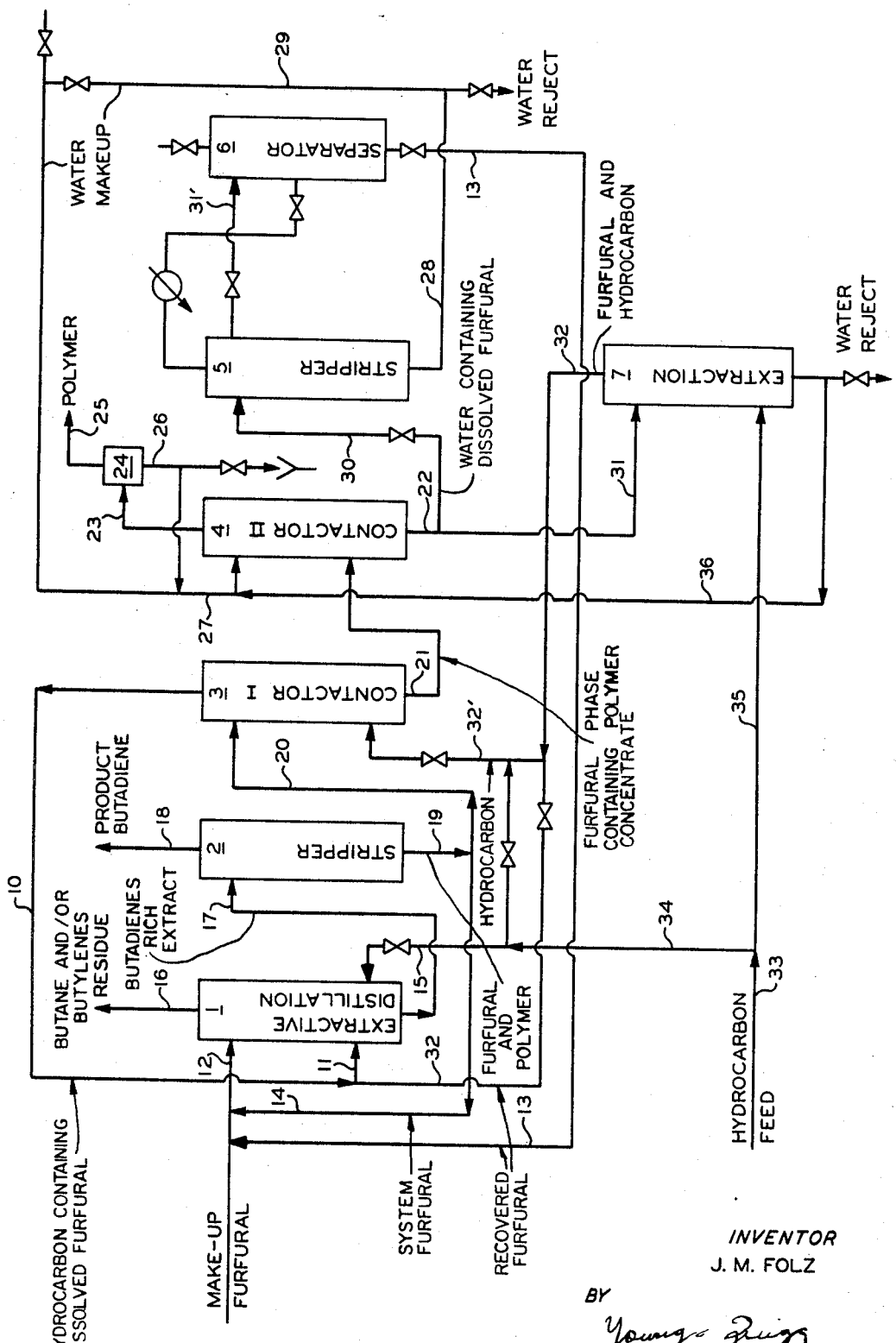
INVENTOR
J. M. FOLZ
BY
*Young & Griggs*
ATTORNEYS United States Patent Office
3,432,569
Patented Mar. 11, 1969

3,432,569
RECOVERY OF FURFURAL FROM FURFURAL POLYMER BY SUCCESSIVE EXTRACTIONS WITH A HYDROCARBON AND WITH WATER
John M. Folz, Bartlesville, Okla., assignor to Phillips Petroleum Company, a corporation of Delaware
Filed July 25, 1966, Ser. No. 567,469
U.S. Cl. 260—680                    6 Claims
Int. Cl. C07d 5/22; C07c 45/24; B01d 11/00

ABSTRACT OF THE DISCLOSURE

A method for the recovery of furfural from furfural polymer is disclosed wherein furfural can be recovered from furfural polymer by contacting the polymer with water. However, before the polymer is contacted with water, it is contacted with a liquid hydrocarbon to remove furfural therefrom. This results in a polymer containing less furfural which will float and which now can be treated with water to recover a water phase containing furfural and a floating polymer from which substantially all furfural has been removed.

---

This invention relates to the recovery of furfural. In one of its concepts, the invention contacts polymer containing furfural with water, floating polymer upon the water with which it has been contacted and removing a water phase containing dissolved furfural. In another of its concepts, the invention relates to a combination of steps in which a polymer concentrate containing furfural is treated in a liquid-liquid extraction process with a hydrocarbon, e.g., a butylenes-butadiene containing stream, to remove furfural from the polymer, following which the polymer is treated with water to recover from the polymer additional furfural.

It is known that furfural is soluble in water. The present invention is based, at least in part, upon the finding that furfural polymers are only slightly soluble in water. It has now been found that increased ultimate or total recovery of furfural is obtainable by treating furfural polymers, for example, resulting from the production of butadiene in known manner from recovery of butadiene with furfural also in known manner, from recovery of furfural for reuse in the process also in known manner, that treating the polymer with water will increase the recovery of furfural. Further, it has been found that a combination of treatments employing at least two solvents in a series type of operation considerably improves the operation and lends flexibility thereto. In any event, the results obtained are clearly better than those obtained when a hydrocarbon alone has been used, for example, when butene-1 has been used.

It is known that the availability of furfural has become critical. Furfural is an expensive solvent and modus operandi for its recovery in more efficient manner are becoming a necessity.

It is an object of this invention to provide a process for the recovery of furfural. It is another object of this invention to provide a more efficient recovery of furfural. It is a still further object of this invention to provide a process for the recovery of furfural basing the process upon the properties of furfural. A further object, still, of the invention is to provide a process making use of the water solubility of furfural in a manner such that a combination of steps involving the recovery of furfural with a hydrocarbon can be utilized to advantage.

Other concepts, objects, and the several advantages of the invention are apparent from a study of this disclosure, the drawing, and the appended claims.

According to the present invention, there is provided an improved process for the recovery of furfural from its polymer formed during the recovery of furfural which has been utilized to recover a hydrocarbon which comprises contacting the polymer with water essentially forming a water phase containing furfural, and recovering the furfural at least in part from said water phase. Still according to the invention, there is provided a process in which furfural polymer obtained as herein described is treated with a hydrocarbon adapted to recover furfural from said polymer whereupon the polymer is further treated by water as herein described.

In the figure, there is shown an embodiment of the several concepts of the invention as it is applied to the recovery of furfural which has been used as solvent in the recovery of butadiene from a catalytic dehydrogenation operation in which butane is converted to butenes and butene converted to butadiene, in known manner.

Referring to the drawing, the following zones are provided:

Zone 1, in which extractive distillation of a butadiene containing stream which has been recovered as herein stated from a butadiene production operation is extractively distilled, employing furfural solvent;

Zone 2, in which a hydrocarbon rich in butadiene-rich furfural is stripped to recover butadiene therefrom as an overhead product resulting in a bottoms containing furfural and furfural polymer;

Zone 3, or a first contactor, in which the furfural and polymer is contacted with a hydrocarbon adapted to recover furfural resulting in a hydrocarbon phase containing dissolved furfural and a residual concentrate composed of furfural and furfural polymer;

Zone 4, or a second contactor, in which the phase containing furfural polymer is contacted with water to obtain a polymer containing phase and a water phase containing dissolved furfural;

Zone 5, in which the water phase containing furfural is stripped to obtain an overhead containing water and furfural and a bottoms containing water;

Zone 6, in which water and furfural form phases and furfural 13 is recovered for reuse in zone 1 in the extractive distillation, and water is returned by 13' to zone 5; and Zone 7, which can, at least in part, be used in lieu of zone 5 wherein the water phase containing dissolved furfural is extracted with a hydrocarbon to form a hydrocarbon-furfural phase and a water phase, at least a part of the latter being used as some of the water feed to zone 4 or the second contacting zone.

More specifically, in extractive distillation zone 1 butane and/or butylenes residue contained in the feed containing the product butadiene is removed overhead by an extractive distillation operation, well known to the art, in which hydrocarbon with dissolved furfural is passed by 10 and 11 to extractive distillation zone 1. Furfural makeup is passed by 12 to zone 1. Additional furfural recovered from the polymer according to the present invention is passed via conduits 13 and 12 to zone 1, and/or via conduits 32 and 11, and/or via conduits 32, 32', 10, and 11 to zone 1. System furfural is passed by 14 into extractive distillation, wherein there is separated from the feed containing butadiene the butane and/or butylenes residue taken off overhead at 16, and a butadiene-rich extract obtained as bottoms 17. The butadiene-containing hydrocarbon feed is introduced into the system by conduit 33 and then by way of conduits 35 and 32; and/or conduits 35, 32, 32' and 10; and/or conduits 35 and 15, into extractive distillation unit 1.

Bottoms 17 are passed to stripper 2 wherein the product butadiene is stripped from furfural and recovered as overhead 18. During the operation, due to heat and other conditions, furfural forms some polymer. The furfural and polymer are recovered from the stripper as bottoms 19 and passed at least in part by 20 to contactor 3. In contactor 3, a hydrocarbon which can be an aliphatic hydrocarbon, e.g., a portion of the hydrocarbon feed, which may be paraffinic or olefinic or diolefinic in character, is passed into liquid-liquid contact with the furfural and its polymer resulting in a recovery of a hydrocarbon phase containing dissolved furfural passed by 10 as earlier described to extractive distillation 1. A furfural phase containing polymer concentrate also obtained in contactor 3 is passed by 21 to contactor 4 wherein it is contacted with water to obtain a water phase which can be passed by 22 to stripper 5. Polymer floated on water is taken overhead as an upper phase and passed by 23 to separator 24. Polymer is removed from the operation by 25 and water can be recycled by 26 and 27 to contactor 2.

According to the invention, water containing dissolved furfural can be passed to stripper 5 by 30. In stripper 5, the furfural is stripped from the water which is taken as bottoms by 28 to recycle water line 29 for recycle by 29 and 27 to contactor 4. Overhead from stripper 5 is cooled, condensed and passed to phase separator 6 from which furfural is obtained as bottoms and passed by 13 and 12 to extractive distillation 1.

According to the invention, some or all of the water containing dissolved furfural can be passed by 22 and 31 to extraction zone 7 wherein furfural can be extracted employing a hydrocarbon, e.g., a portion of the hydrocarbon feed, suitable for extracting furfural from the water. A hydrocarbon-furfural phase is passed by 32 and 11 to extractive distillation 1. Water is removed by 36 and can be recycled to conduit 27. A portion of the hydrocarbon feed-furfural can be passed by 32 and 32' to contactor 3.

The following table is an example of the various flows and other related conditions which are helpful to a quicker understanding of the invention according to the embodiment just described:

SPECIFIC EXAMPLE

| Unit Condition | Tower (1) | Stripper (2) | Contactor (3) | Contactor (4) | Stripper (5) | Separator (6) | Tower (7) |
|---|---|---|---|---|---|---|---|
| Pressure, p.s.i.g. | 60 | 55 | 75 | 70 | 5 | 5 | 65 |
| Top Temp., °F. | 106 | 132 | ¹90 | ¹90 | 223 | 100 | 90 |
| Bottom Temp., °F. | 243 | 299 | ¹90 | ¹90 | 225 | 100 | 90 |

FLOW QUANTITIES, GALLONS PER HOUR (Except as Noted)

| Steam Component | (20) | (32) | (32') | (21) | (27) | (12) | (35) | Water Reject | (25) | (19) | (18) | (16) |
|---|---|---|---|---|---|---|---|---|---|---|---|---|
| Furfural | 3,000 | 90 | | 90 | | 21 | | | | 70,000 | | |
| Water | | | | | 3,300 | | | 0 | | | | |
| Polymer | ²0.3 | | | 9 | | | | 80#/hr | | | | |
| Butane-butylenes | 10,000 | 5,000 | | | | 15,000 | | | | | | 10,000 |
| Butadiene | | | | | | | | | | | | ³5,000 |

NOTE.—In specific example, stripper (5) and separator (6) are not used. Conditions are given for these units, however. (No flow in 13, 15, 28, 29, 30).
¹ Ambient temperature.
² Wt. percent.
³ Contains some butane-butylenes.

It will be evident to one skilled in the art in possession of this disclosure, having studied the same, that the foregoing drawing and its description are diagrammatic and that various valves, pumps, internal structures, heaters, coolers, steam sources, etc. which can be designed into an actual operation have been omitted for sake of simplicity. Further, it will be apparent to him that considerable variation and modification are possible within the embodiment described and within the scope of the invention to modify modus operandi or steps or conditions thereof without, however, abandoning the essential concepts of the invention as these are set forth in the accompanying claims.

A number of patents which are more or less related to the field in which the invention lies are as follows: 2,372,668, Apr. 3, 1945, K. H. Hachmuth (PPCo.); 2,379,332, June 26, 1945, P. M. Arnold (PPCo.); 2,411,785, Nov. 26, 1946, K. H. Hachmuth (PPCo); 2,412,823, Dec. 17, 1946, B. J. Mayland (PPCo.); 2,414,402, Jan. 14, 1947, G. Thodos et al. (PPCo.); 2,446,728, Aug. 10, 1948, G. Thodos (PPCo.).

Reasonable variation and modification are possible within the scope of the foregoing disclosure, the drawing and the appended claims to the invention, the essence of which is that recovery of furfural which has been employed for solvent extraction or extractive distillation of hydrocarbons, for example, has been importantly increased and improved by treating polymer obtained with water to obtain a water phase containing furfural from which phase furfural can be readily recovered, and that a combination of steps has been set forth involving an arrangement whereby the polymer is apriori treated with a hydrocarbon and then with water, substantially as described.

I claim:

1. The recovery of furfural from furfural polymer which comprises contacting said polymer with a hydrocarbon to recover furfural from said polymer under extraction conditions and then contacting the thus treated polymer with water to recover therefrom the remaining furfural therein.

2. An operation according to claim 1 wherein the furfural polymer is treated with water in a contacting step from which the polymer is recovered by floating it off from a water phase which contains dissolved furfural from which the dissolved furfural is recovered.

3. In an operation for the production of butadiene in which furfural is used for recovery of said butadiene and is later itself recovered from a furfural polymer formed in the operation which comprises dehydrogenating butane to produce butadiene contained in a stream of hydrocarbons and removing said butadiene from said stream of hydrocarbons by extractive distillation employing furfural, thus unavoidably forming furfural polymer, the improvement which comprises contacting said polymer under extraction conditions with a hydrocarbon to recover furfural from said polymer and then contacting the thus treated polymer with water to recover therefrom remaining furfural therein.

4. An operation according to claim 3 wherein the hydrocarbon obtained upon treating the furural polymer, the hydrocarbon now containing dissolved furfural, is used at least in part in said extractive distillation and the furfural polymer after removal of the furfural therefrom, which is now in the hydrocarbon, is treated with water to obtain a water phase containing dissolved furfural, said water phase is then subjected to stripping conditions to recover furfural therefrom, and the recovered furfural is, at least in part, used in said extractive distillation.

5. An operation according to claim 4 wherein at least a portion of the water containing dissolved furfural obtained from said water treatment of said polymer is treated under extraction conditions with a hydrocarbon to recover a phase containing hydrocarbon and furfural.

6. An operation according to claim 5 wherein said phase containing hydrocarbon and furfural is at least in part used in said extractive distillation.

References Cited

UNITED STATES PATENTS

| | | | |
|---|---|---|---|
| 2,350,609 | 6/1944 | Hachmuth | 203—44 |
| 2,372,668 | 4/1945 | Hachmuth | 260—681.5 |
| 2,409,781 | 10/1946 | Mertz | 203—58 |
| 2,414,402 | 1/1947 | Thodos et al. | 203—43 |
| 2,415,921 | 2/1947 | Wagner | 203—54 |
| 2,428,120 | 9/1947 | Miller | 260—681.5 |
| 2,446,728 | 8/1948 | Thodos | 260—347.9 |
| 2,742,411 | 4/1956 | Leary et al. | 203—46 |
| 3,026,254 | 3/1962 | Hutto | 203—83 |

WILBUR L BASCOMB, JR., *Primary Examiner.*

U.S. Cl. X.R.

203—17, 43, 62, 84, 85; 260—347.8, 347.9, 681.5